US012665189B2

(12) United States Patent
Wen et al.

(10) Patent No.: US 12,665,189 B2
(45) Date of Patent: Jun. 23, 2026

(54) CATHODE MATERIAL MADE OF COBALT-FREE LAYERED OXIDE

(71) Applicant: NINGBO INSTITUTE OF MATERIALS TECHNOLOGY AND ENGINEERING, CHINESE ACADEMY OF SCIENCES, Ningbo (CN)

(72) Inventors: Xiaohui Wen, Ningbo (CN); You Shang, Ningbo (CN); Bao Qiu, Ningbo (CN); Qingwen Gu, Ningbo (CN); Zhaoping Liu, Ningbo (CN)

(73) Assignee: NINGBO INSTITUTE OF MATERIALS TECHNOLOGY AND ENGINEERING, CHINESE ACADEMY OF SCIENCES, Ningbo (CN)

( * ) Notice: Subject to any disclaimer, the term of this patent is extended or adjusted under 35 U.S.C. 154(b) by 580 days.

(21) Appl. No.: 18/266,599

(22) PCT Filed: Oct. 13, 2022

(86) PCT No.: PCT/CN2022/125096
§ 371 (c)(1),
(2) Date: Jun. 12, 2023

(87) PCT Pub. No.: WO2023/155452
PCT Pub. Date: Aug. 24, 2023

(65) Prior Publication Data
US 2024/0274798 A1 Aug. 15, 2024

(30) Foreign Application Priority Data
Feb. 21, 2022 (CN) ........................ 202210157606.0

(51) Int. Cl.
*H01M 4/36* (2006.01)
*H01M 4/02* (2006.01)
(Continued)

(52) U.S. Cl.
CPC ........... *H01M 4/366* (2013.01); *H01M 4/525* (2013.01); *H01M 10/0525* (2013.01); *H01M 2004/028* (2013.01)

(58) Field of Classification Search
None
See application file for complete search history.

(56) References Cited

U.S. PATENT DOCUMENTS 7,468,223 B2 * 12/2008 Thackeray ............ H01M 4/505 429/223
7,476,467 B2 * 1/2009 Park ....................... C01G 53/50 429/231.5
(Continued)

FOREIGN PATENT DOCUMENTS

CN 103078104 A 5/2013
CN 106058236 A 10/2016
(Continued)

OTHER PUBLICATIONS

European Search Report issued on Nov. 18, 2024 for the European counterpart application No. 22902472.4.
(Continued)

*Primary Examiner* — Kevin M Bernatz
(74) *Attorney, Agent, or Firm* — Yue (Robert) Xu; Apex Attorneys at Law, LLP

(57) ABSTRACT

A cathode material made of cobalt-free layered oxide. A primary particle of the cathode material includes a lithium-poor phase $Li_aM_{2-a}O_2$ and a lithium-rich phase $Li_2M'O_3$ which are of a layered-like structure. Coordination between these two phases is capable to address an issue of low energy
(Continued)

density, low initial coulombic efficiency, and low lithium utilization of conventional cobalt-free layered cathode materials. The novel cobalt-free layered cathode material can be applied to lithium-ion batteries to achieve a low cost and high energy density.

12 Claims, 1 Drawing Sheet

(51) Int. Cl.
*H01M 4/525* (2010.01)
*H01M 10/0525* (2010.01)

(56) References Cited

U.S. PATENT DOCUMENTS

| | | | | |
|---|---|---|---|---|
| 10,720,642 | B2 * | 7/2020 | Chan | H01M 4/525 |
| 2003/0170540 | A1 | 9/2003 | Ohzuku et al. | |
| 2004/0081888 | A1 * | 4/2004 | Thakeray | H01M 4/525 429/223 |
| 2012/0263998 | A1 | 10/2012 | Thackeray et al. | |
| 2013/0078518 | A1 | 3/2013 | Thackeray et al. | |
| 2015/0030925 | A1 | 1/2015 | Konishi et al. | |
| 2015/0180032 | A1 | 6/2015 | Thackeray et al. | |
| 2015/0303453 | A1 | 10/2015 | Yang | |
| 2016/0301065 | A1 | 10/2016 | Sakai | |
| 2017/0047587 | A1 * | 2/2017 | Thackeray | H01M 4/505 |
| 2018/0309122 | A1 * | 10/2018 | Thackeray | H01M 4/485 |
| 2018/0351174 | A1 | 12/2018 | Paulsen | |
| 2020/0083522 | A1 | 3/2020 | Han | |

FOREIGN PATENT DOCUMENTS

| | | | |
|---|---|---|---|
| CN | 107215900 | A | 9/2017 |
| CN | 108140828 | A | 6/2018 |
| CN | 110383541 | A | 10/2019 |
| CN | 111370666 | A | 7/2020 |
| CN | 112225261 | A | 1/2021 |
| JP | 2002063903 | A | 2/2002 |
| JP | 2013175401 | A | 9/2013 |
| JP | 2014001099 | A | 1/2014 |
| TW | 201514142 | A | 4/2015 |
| WO | 02078105 | A1 | 10/2002 |

OTHER PUBLICATIONS

Japanese office action issued on Jul. 9, 2024 for JP application No. 2023-536359.

International Search Report for PCT/CN2022/125096 mailed Nov. 25, 2022, ISA/CN.

* cited by examiner

CATHODE MATERIAL MADE OF COBALT-FREE LAYERED OXIDE

The present disclosure is the national phase of International Application No. PCT/CN2022/125096, titled "CATHODE MATERIAL MADE OF COBALT-FREE LAYERED OXIDE", filed on Oct. 13, 2022, which claims the priority to Chinese patent application No. 2022101576060 titled "CATHODE MATERIAL MADE OF COBALT-FREE LAYERED OXIDE", filed with the China National Intellectual Property Administration on Feb. 21, 2022, which is incorporated herein by reference in its entirety.

FIELD

The present disclosure relates to the technical field of lithium-ion batteries, in particular to a cathode material made of cobalt-free layered oxide and an application of the cathode material made of cobalt-free layered oxide.

BACKGROUND

Nowadays there is an increasing demand for mobile energy storage devices. Lithium-ion batteries are featured in high energy density and good cycling performances, and hence have a growing application in new energy vehicles and 3 C digital products. At present, commercialized cathode materials include lithium iron phosphate, lithium manganate, and ternary layered oxide cathode materials based on nickel/cobalt/manganese.

Lithium iron phosphate and lithium manganate is cheap but have low energy density. Generally, a commercialized layered cathode material includes cobalt which is a "precious metal", and hence it is difficult to lower a cost. At present, the cobalt-free layered materials are mainly developed in two directions. The first one is removing cobalt directly from the traditional nickel/cobalt/manganese ternary layered oxide materials to obtain cobalt-free layered material $LiNi_xMn_{1-x}O_2$ ($0<x<1$). The second direction is removing cobalt from lithium-rich manganese-based layered oxide to prepare a common cobalt-free lithium-rich layered material $xLiMO_2 \cdot (1-x)Li_2M'O_3$ ($0<x<1$, M=Ni+Mn; M'=Mn).

In general, the energy density of the traditional cobalt-free layered material is lower than that of the lithium-rich layered oxide, where a specific capacity is lower than 220 mAh/g and a rate of lithium utilization is lower than 80%. Although having a higher specific capacity (>220 mAh/g), the cobalt-free lithium-rich layered material has a low initial coulombic efficiency, low lithium utilization, and a poor rate capability.

SUMMARY

Embodiments of the present disclosure aims to provide a cathode material made of cobalt-free layered oxide, which can achieve high initial coulombic efficiency and high lithium utilization when being applied to a lithium-ion battery.

In view of the above, a cathode material made of cobalt-free layered oxide is provided according to an embodiment of the present disclosure, where a chemical formula of the cathode material is $xLi_aM_{2-a}O_2 \cdot 2(1-x)/3Li_2M'O_3$, where: a primary particle of the cathode material includes $Li_aM_{2-a}O_2$ of a lithium-poor phase and $Li_2M'O_3$ of a lithium-rich phase which have a layered-like structure; x is a proportion of the lithium-poor phase in the cathode material, a is an occupancy of Li in a lithium atomic layer in the lithium-poor phase, $0<x<1$, and $0.5<a<1$; an M ion includes an A ion and an M' ion, a ratio of an ionic radius of the A ion to an ion radius of an lithium ion is greater than 0.9 and smaller than 1.1, and the M' ion includes one or more of: $Mn^{4+}$, $Zr^{4+}$, $Ti^{4+}$, $V^{4+}$, $Sn^{4+}$, or $Ru^{4+}$.

In one embodiment, the A ion includes one or more of: $Ni^{2+}$, $Cu^{+}$, $Zn^{2+}$, or $Fe^{2+}$.

In one embodiment, the M ion further includes an auxiliary ion, and the auxiliary ion includes one or both of $Al^{3+}$ and $Cr^{3+}$.

In one embodiment, a weighted average valence between the M ion and the M' ion is greater than 2.9 and smaller than 3.25.

In one embodiment, there is $0.3<x<0.8$.

In one embodiment, there is $0.75<a<0.95$.

In one embodiment, a proportion of the A ion among the M ion is not less than 5%.

In one embodiment, in an X-ray diffraction pattern of the cathode material, a distinct super-lattice peak is located at right of an (003) peak, a ratio of an integral area of the (003) peak to an integral area of a (104) peak is smaller than 1.1, besides there are a large overlap and small cleavage between a (018) peak and a (110) peak.

An electrode is further provided according to embodiments of the present disclosure, including the cathode material made of cobalt-free layered oxide according to the foregoing embodiments.

A lithium-ion battery or a lithium metal battery is further provided according to embodiments of the present disclosure, including a cathode and an anode, where the cathode is the foregoing electrode.

The cathode material made of cobalt-free layered oxide is provided according to embodiments of the present disclosure. The cathode material is fabricated by forming a "nano-composite" of the lithium-poor phase $Li_aM_{2-a}O_2$ and the lithium-rich phase $Li_2M'O_3$ within a primary particle. In the lithium-poor phase, not all cation sites in the lithium atomic layer are occupied by lithium ions, where a large portion is occupied by transition-metal ions, while cation sites in the transition-metal atomic layer are still nearly all occupied by the transition metal ions. The large quantity of the transition metal ions in the lithium atomic layer of such initial material is capable to stabilize a layered structure under a high voltage during charging, and increase the redox reversibility of lattice oxygen greatly. Therefore, such novel cathode material can fully exploit activity of the lattice oxygen, thereby obtaining high specific capacity, high initial coulombic efficiency, and high lithium utilization.

BRIEF DESCRIPTION OF THE DRAWINGS

FIG. 4 is an X-ray diffraction pattern of $0.625Li_{0.945}Ni_{0.582}Mn_{0.473}O_2 \cdot 0.25Li_2MnO_3$ according to an embodiment of the present disclosure.

FIG. 5 is a high angle annular dark field image under scanning transmission electron microscopy (STEM-HADDF image) of $0.625Li_{0.945}Ni_{0.582}Mn_{0.473}O_2 \cdot 0.25Li_2MnO_3$ according to an embodiment of the present disclosure.

FIG. 6 is an initial charge-discharge curve of $0.625Li_{0.945}Ni_{0.582}Mn_{0.473}O_2$ $0.25Li_2MnO_3$ according to an embodiment of the present disclosure.

FIG. 7 is an X-ray diffraction pattern of $0.7Li_{0.857}Ni_{0.714}Mn_{0.429}O_2 \cdot 0.2Li_2MnO_3$ according to another embodiment of the present disclosure.

FIG. 8 is an X-ray diffraction pattern of $0.8Li_{0.778}Ni_{0.833}Mn_{0.389}O_2 \cdot 0.2Li_2MnO_3$ according to another embodiment of the present disclosure.

FIG. 9 is an X-ray diffraction pattern of $0.5Li_{0.848}Ni_{0.727}Ti_{0.424}O_2 \cdot 0.33Li_2TiO_3$ according to another embodiment of the present disclosure.

FIG. 10 is an X-ray diffraction pattern of $0.6Li_{0.778}Fe_{0.833}Mn_{0.389}O_2 \cdot 0.267Li_2MnO_3$ according to another embodiment of the present disclosure.

DETAILED DESCRIPTION

Hereinafter preferable implementation of the present disclosure is described in conjunction with embodiments for better understanding of the present disclosure. It should be understood that the description is only intended for further illustrating features and advantages of the present disclosure rather than limiting the claims of the present disclosure.

Conventional cathode materials made of cobalt-free layered oxide have drawbacks such as low energy density, low initial coulombic efficiency, and poor redox reversibility of the lattice oxygen. In order to address the above issue, a novel cathode material including both a lithium-poor phase and a lithium-rich phase is provided according to embodiments of the present disclosure. Such material has a special nanocomposite structure having the two phases within a primary particle. Thereby, the energy density, the initial coulombic efficiency, and lithium utilization of the cobalt-free layered cathode material are significantly improved. Specifically, a cathode material made of cobalt-free layered oxide is provided according to an embodiment of the present disclosure. A chemical formula of the cathode material may be as shown in formula (I).

$$xLi_aM_{2-a}O_2 \bullet 2(1-x)/3Li_2M'O_3 \quad (I)$$

A primary particle of the cathode material includes $Li_aM_{2-a}O_2$, which is of a lithium-poor phase, and $Li_2M'O_3$, which is of a lithium-rich phase. Both $Li_aM_{2-a}O_2$ and $Li_2M'O_3$ are of a layered-like structure.

x is a proportion of the lithium-poor phase in the cathode material, a is an occupancy of Li in a lithium atomic layer in the lithium-poor phase, and there is $0<x<1$ and $0.5<a<1$.

M represents ions including an A ion and an M' ion. An ionic radius $r_A$ of the A ion and an ion radius $r_{Li}$ of an lithium ion meets $0.9<r_A/r_{Li}<1.1$.

M' represents one or more of: $Mn^{4+}$, $Zr^{4+}$, $Ti^{4+}$, $V^{4+}$, $Sn^{4+}$, or $Ru^{4+}$.

Figure 1:
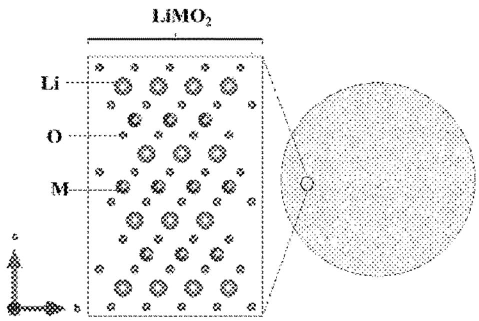
FIG. 1 is a schematic diagram of a traditional cobalt-free layered cathode material $LiMO_2$.

The novel cathode material is compared with a traditional layered oxide cathode material and a lithium-rich layered oxide cathode material in crystal structure, so as to illustrate characteristics of the novel cathode material. A chemical formula of the traditional cobalt-free layered oxide may be denoted as $LiMO_2$, in which main content of M is Ni and Mn, and a ratio Li:M is equal to 1:1. FIG. 1 is a schematic structural diagram of the traditional cobalt-free layered cathode material. The lithium atomic layer and the transition-metal atomic layer are interleaved along the c-axis. In such traditional layered oxide cathode material, the whole of the lithium atomic layer is nearly formed by only the lithium ions, and the whole of the transition-metal layer is nearly formed by only the transition-metal ions, i.e., M ions.

Figure 2:
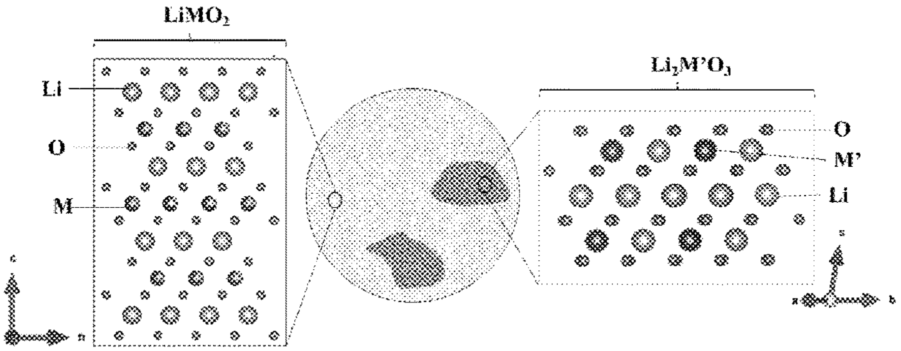
FIG. 2 is a schematic diagram of a common cobalt-free lithium-rich layered cathode material $xLiMO_2 \cdot (1-x)Li_2M'O_3$.

A chemical formula of the common cobalt-free lithium-rich layered oxide cathode material may be denoted as $xLiMO_2 \cdot (1-x)Li_2M'O_3$ $(0<x<1)$, in which main content of M is Ni and Mn, and main content M' is Mn. FIG. 2 shows a schematic structural diagram of the common cobalt-free lithium-rich layered oxide, which can be regarded as a nanoscale composite of a $LiMO_2$ phase and a $Li_2M'O_3$ phase. The $LiMO_2$ phase is similar to the conventional layered oxide cathode material, as shown in FIG. 1, in crystal structure and arrangement of transition-metal ions, and there is no obvious mixing arrangement between the transition-metal ions and the lithium ions. The $Li_2M'O_3$ phase is not a "layered" material in strict meaning, because one-third of the oxygen octahedral interpositions within the transition-metal atomic layer are occupied by lithium ions. The transition metal ions, i.e., M' ions, and the lithium ions are arranged in an orderly manner in the transition-metal atomic layer. Although a pure $Li_2MnO_3$ phase is electrochemically inactive, lattice oxygen would show electrochemical activity under a high voltage (>4.5V) when the $Li_2MnO_3$ phase and the $LiMO_2$ phase form the nanocomposite within the primary particle. Such nanocomposite engenders a specific capacity higher than 250 mAh/g in the lithium-rich layered oxide.

Figure 3:
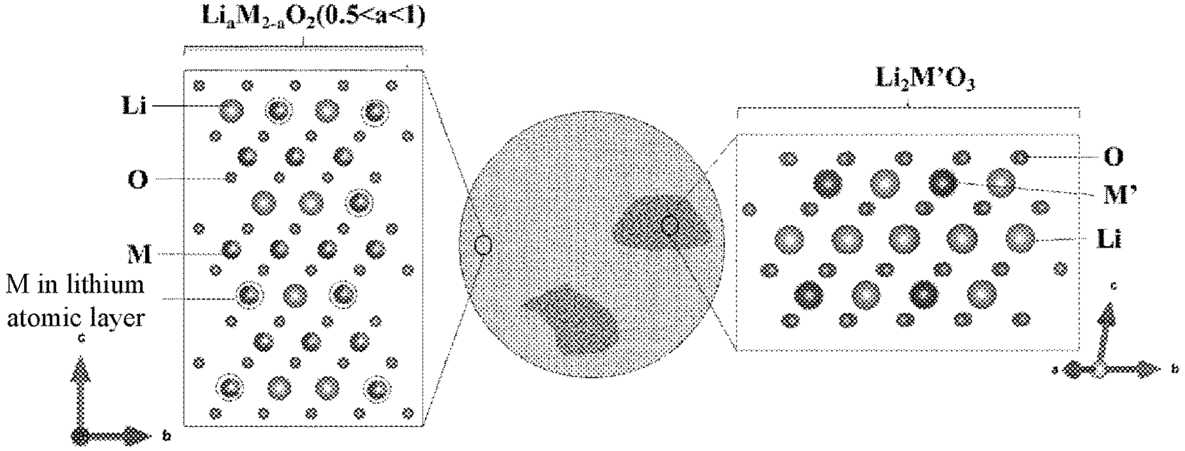
FIG. 3 is a schematic diagram of a cobalt-free layered cathode material $xLi_aM_{2-a}O_2 \cdot (1-x)Li_2M'O_3$ according to an embodiment of the present disclosure.

The chemical formula of the novel cobalt-free layered cathode material according to embodiments of the present disclosure can be denoted as $xLi_aM_{2-a}O_2 \cdot 2(1-x)/3Li_2M'O_3$. A schematic structural diagram of the novel cobalt-free layered cathode material is as shown in FIG. 3. Such material may be regarded as a nanocomposite of the lithium-poor phase, i.e., $Li_aM_{2-a}O_2$, and the lithium-rich phase, i.e., $Li_2M'O_3$, within a primary particle. The lithium-rich phase $Li_2M'O_3$ has the same crystal structure as the lithium-rich phase in the cobalt-free lithium-rich layered oxide as shown in FIG. 2. Thus, such novel material can also present the electrochemical activity of lattice oxygen and achieve a high charge/discharge specific capacity as the common lithium-rich layered oxide material. It is noted that such novel cathode material further has the lithium-poor phase, i.e., $xLi_aM_{2-a}O_2$ $(0<a<1)$, and the ratio Li:M is smaller than 1 in the lithium-poor phase. Hence, cation sites in the lithium atomic layer are no longer all occupied by lithium ions, and a large portion of the cation sites is occupied by the transition-metal ions. In comparison, the cation sites in the transition-metal atomic layer are still nearly fully occupied by the transition-metal ions. The large quantity of the transition metal ions in the lithium atomic layer of the initial material stabilizes the layered structure under a high voltage during charging, which increases the redox reversibility of the lattice oxygen significantly. Therefore, the novel cathode material can fully exploit the activity of the lattice oxygen to achieve high specific capacity, high initial coulombic efficiency, and high lithium utilization.

Herein the lithium-poor phase $Li_aM_{2-a}O_2$ should include three types of cations, i.e., lithium ions (Li ions), A-type ions (A ions, of which a radius is close to that of the Li ion), and M'-type (M' ions, of which a valence is +4 and which is apt to form the lithium-rich phase $Li_2MO_3$). The lithium-poor phase $Li_aM_{2-a}O_2$ may further include auxiliary cations. That is, the M ions (metal ions) represent multiple types of ions which may include the A ions, the M' ions, and the auxiliary cations. An ionic radius $r_A$ of the A ions and the ionic radius $r_L$ of the Li ions meets $0.9<r_A/r_{Li}<1.1$. In some embodiments, the A ions include one or more of $Ni^{2+}$, $Cu^{+}$, $Zn^{2+}$ or $Fe^{2+}$. A proportion the A ions among the M ions should be no less than 5%. The auxiliary cations include one or both of $Al^{3+}$ and $Cr^{3+}$. A proportion of the M' ions having +4 valence among the M ions is adjusted according to a value of a so as to control an average valence of the M ions. Generally, a preferable range of such proportion is from 20% to 50%. The average valence of the M ions is $$n = \frac{4-a}{2-a}.$$

The M ions should include the A ions, such as one of $Ni^{2+}$, $Cu^{+}$, $Zn^{2+}$, or $Fe^{2+}$. The reason lies in that the ionic radius of such A ions is quite similar to that of $Li^{+}$ when forming a hexa-coordinate octahedron with 0 ions, and thus they can replace $Li^{+}$ easily without significant change in structure when forming the Li-poor phase $L_aM_{2-a}O_2$. The M ions should further include the transition-metal ions, i.e., the M' ions, which is also present in the lithium-rich phase with which the Li-poor phase forms the composite. The reason lies in that the M' ions can facilitate the lithium-poor phase $Li_aM_{2-a}O_2$ and the lithium-rich phase $Li_2M'O_3$ forming the complex nanocomposite having the two phases within the primary particle, stimulating the redox activity of the lattice oxygen in the lithium-rich phase, and thereby engenders the high specific capacity.

In some embodiments, a weighted average valence n between the M ions and the M' ions meets 2.9<n<3.25, and there are 0.3<x<0.8 and 0.75<a<0.95.

The cathode material made of cobalt-free layered oxide according to embodiments of the present disclosure can be fabricated through a high-temperature solid-phase method, a co-precipitation method, or another conventional method, according to the raw materials and a ratio of the raw materials which are determined. Specific fabrication methods are not limited herein.

Herein an X-ray diffraction pattern of the cathode material have following features. First, a distinct super-lattice peak is located at right of an (003) peak. Second, a ratio of an integral area of the (003) peak to an integral area of a (104) peak is smaller than 1.1. Third, there are a large overlap and small cleavage between a (018) peak and a (110) peak. Such X-ray diffraction pattern indicates that in the novel cathode material, cation sites in the lithium atomic layer are occupied by a large number of the transition-metal ions, and the interleaved-layer arrangement of transition-metal ions and the lithium atoms is not obvious.

An electrode is further provided according to an embodiment of the present disclosure. The electrode includes the cathode material made of cobalt-free layered oxide according to the foregoing embodiments.

A lithium-ion battery or a lithium metal battery is further provided according to an embodiment of the present disclosure. The battery includes a cathode and an anode, and the cathode is the forgoing electrode.

Those skilled in the art can appreciate that layered oxide refers to a crystal structure in which oxygen ions forms an octahedral structural skeleton, and lithium ions and transition-metal ions are arranged as atomic layers at interpositions among the oxygen ions. The lithium atomic layers and transition metal atomic layers are interleaved along the c-axis of crystal cells. A rate of lithium utilization of the layered oxide cathode material is equal to a ratio of an amount of lithium that can be reversibly detached and embedded in the cathode to an a total amount of lithium in the cathode, and is further equal to a ratio of the initial discharging specific capacity to a theoretical specific capacity.

The cathode material according to embodiments the present disclosure has a two-phase structure, i.e., including the lithium-poor phase and the lithium-rich phase. The synergistic effect between these two phases is capable to address the issue of low energy density, low initial coulombic efficiency, and low lithium utilization of the conventional cobalt-free layered cathode materials. The novel cobalt-free layered cathode material can be applied to lithium-ion batteries to achieve a low cost and high energy density.

Hereinafter the cathode material made of cobalt-free layered oxide is described in detail in conjunction with embodiments, in order to facilitate further understanding of the present disclosure. The protection scope of the present disclosure is not limited by following embodiments.

First Embodiment

A novel cathode material made of cobalt-free layered oxide includes a lithium-poor phase and a lithium-rich phase. A composition of the lithium-poor phase is $Li_{0.945}Ni_{0.582}Mn_{0.473}O_2$, and a composition of the lithium-rich phase is $Li_2MnO_3$. Proportions of the lithium-poor phase and the lithium-rich phase are 62.5% and 37.5%, respectively. The chemical formula is $0.625Li_{0.945}Ni_{0.582}Mn_{0.473}O_2 \cdot 0.25Li_2MnO_3$ (in which $0.375Li_{4/3}Mn_{2/3}O_2$ was written as $0.25Li_2MnO_3$).

The cathode material is synthesized through a co-precipitation method. $NiSO_4$ and $MnSO_4$ are mixed into a solution according to a stoichiometric ratio of Ni:Mn=2:3, and the solution is added dropwise into a $Na_2CO_3$ solution. An obtained precipitate is filtered and dried to obtain a precursor in which Ni and Mn are uniformly distributed according to the stoichiometric ratio. Then, the precursor is mixed with $Li_2CO_3$ according to a stoichiometric ratio, and is subject to high-temperature solid-phase sintering to obtain the novel cobalt-free layer cathode material.

As shown in FIGS. 4 and 5, the X-ray diffraction (XRD) pattern and the spherical aberration-corrected scanning transmission electron microscopy show that the material is mainly layered oxide having two phases, i.e., the lithium-poor phase and the lithium-rich phase. FIG. 6 shows typical electrochemical properties of the novel cobalt-free layered cathode material.

The structure of the material and the results of the electrochemical characterization test on the material indicate following characteristics.

(1) A super-lattice peak exists at approximate 20 degrees in the X-ray diffraction pattern under a X-ray wavelength of 0.154 nm.

(2) A ratio of an integral area of the (003) peak to that of the (104) peak is smaller than 1.1.

(3) The (018) peak and the (110) peak are almost completely overlapped.

(4) When the atoms of the material are observed under the spherical aberration-corrected transmission electron microscopy along a direction perpendicular to the [003] crystal orientation, a large number of transition-metal atoms (Ni atoms) can be found in the lithium atomic layer. That is, a structure of the lithium-poor phase is formed.

(5) Both the initial coulombic efficiency and a rate of lithium utilization can exceed 90%.

Second Embodiment

The cathode material made of cobalt-free layered oxide has a chemical formula of $0.7Li_{0.857}Ni_{0.714}Mn_{0.429}O_2 \cdot 0.2Li_2MnO_3$.

The cathode material is synthesized through a co-precipitation method. $NiSO_4$ and $MnSO_4$ are mixed into a solution according to a stoichiometric ratio of Ni:Mn=1:1, and the solution is added dropwise into a $Na_2CO_3$ solution. An obtained precipitate is filtered and dried to obtain a precursor in which Ni and Mn are distributed uniformly according to the stoichiometric ratio. Then, the precursor is mixed with $Li_2CO_3$ according to an stoichiometric ratio, and is subject to high-temperature solid-phase sintering to obtain the novel cobalt-free layer cathode material.

Similar to the first embodiment, the XRD pattern of the cathode material shows a distinct characteristic of a two-phase composite including the lithium-poor phase and the lithium-rich phase (as shown in FIG. 7).

Third Embodiment

The cathode material made of cobalt-free layered oxide has a chemical formula of $0.8Li_{0.778}Ni_{0.833}Mn_{0.389}O_2 \cdot 0.2Li_2MnO_3$.

The cathode material is synthesized through a co-precipitation method. $NiSO_4$ and $MnSO_4$ are mixed into a solution according to a stoichiometric ratio of Ni:Mn=3:2, and the solution is added dropwise into a $Na_2CO_3$ solution. An obtained precipitate is filtered and dried to obtain a precursor in which Ni and Mn are uniformly distributed according to the stoichiometric ratio. Then, the precursor is mixed with $Li_2CO_3$ according to an stoichiometric ratio, and is subject to high-temperature solid-phase sintering to obtain the novel cobalt-free layer cathode material.

Similar to the first embodiment, the XRD pattern of the cathode material shows a distinct characteristic of a two-phase composite including the lithium-poor phase and the lithium-rich phase (as shown in FIG. 8).

Fourth Embodiment

The cathode material made of cobalt-free layered oxide has a chemical formula of $0.5Li_{0.848}Ni_{0.727}Ti_{0.424}O_2 \cdot 0.33Li_2TiO_3$.

The cathode material is synthesized through a high-temperature solid-phase method. $Li_2CO_3$, $NiCO_3$, and $Ti[OCH(CH_3)_2]_4$ are uniformly mixed via a ball mill according to a stoichiometric ratio of Li:Ni:Ti=6:2:3, and then calcined at 800° C. for 12 hours.

Similar to the first embodiment, the XRD pattern of the cathode material shows a distinct characteristic of a two-phase composite including the lithium-poor phase and the lithium-rich phase (as shown in FIG. 9).

Fifth Embodiment

The cathode material made of cobalt-free layered oxide has a chemical formula of $0.6Li_{0.778}Fe_{0.833}Mn_{0.389}O_2 \cdot 0.267Li_2MnO_3$.

The cathode material is synthesized through a high-temperature solid-phase method. $Li_2CO_3$, FeO, and $MnO_2$ are uniformly mixed via a ball mill according to a stoichiometric ratio, and then calcined at 800° C. for 12 hours under an inert gas.

Similar to the first embodiment, the XRD pattern of the cathode material shows a distinct characteristic of a two-phase composite including the lithium-poor phase and the lithium-rich phase (as shown in FIG. 10).

The foregoing embodiments are only intended for helping understand a method and a core concept of the present disclosure. Those skilled in the art can make several improvements and modifications based on the present disclosure without departing from the principles of the present disclosure, and these improvements and modifications shall also fall within the protection scope of the claims of the present disclosure.

According to the description of the disclosed embodiments, those skilled in the art can implement or use the present disclosure. Various modifications made to these embodiments may be obvious to those skilled in the art, and the general principle defined herein may be implemented in other embodiments without departing from the spirit or scope of the present disclosure. Therefore, the present disclosure is not limited to the embodiments described herein but conforms to a widest scope in accordance with principles and novel features disclosed in the present disclosure.

The invention claimed is:

1. A cathode material made of cobalt-free layered oxide, wherein:

a chemical formula of the cathode material is $xLi_aM_{2-a}O_2 \cdot 2(1-x)/3Li_2M'O_3$;

a primary particle of the cathode material comprises $Li_aM_{2-a}O_2$ of a lithium-poor phase and $Li_2M'O_3$ of a lithium-rich phase which have a layered like structure;

the lithium-poor phase comprises first atomic layers and second atomic layers that are interleaved, the first atomic layers comprise a first part of lithium ions and a part of M ions, and the second atomic layers comprise another part of the M ions;

the lithium-rich phase comprises third atomic layers and fourth atomic layers that are interleaved, the third atomic layers comprise a second part of the lithium ions, and the fourth atomic layers comprise a third part of the lithium ions and M' ions;

x is a proportion of the lithium-poor phase in the cathode material, a is an occupancy of Li in a lithium atomic layer in the lithium-poor phase, $0<x<1$, and $0.5<a<1$; and the M ions comprises a first ion and a second ion, a ratio of an ionic radius of the first ion to an ion radius of an lithium ion is greater than 0.9 and smaller than 1.1, and an element of the second ion is identical to an element of the M' ions.

2. The cathode material according to claim 1, wherein the A ion the first ion comprises one or more of: $Ni^{2+}$, $Cu^{+}$, $Zn^{2+}$, or $Fe^{2+}$.

3. The cathode material according to claim 1, wherein the M ions further comprise one or both of $Al^{3+}$ and $Cr^{3+}$.

4. The cathode material according to claim 1, wherein a weighted average valence between the M ions and the M' ions is greater than 2.9 and smaller than 3.25.

5. The cathode material according to claim 1, wherein $0.3<x<0.8$.

6. The cathode material according to claim 1, wherein $0.75<a<0.95$.

7. The cathode material according to claim 1, wherein a proportion of the first ion among the M ions is not less than 5%.

8. The cathode material made of cobalt-free layered oxide according to claim 1, wherein in an X-ray diffraction pattern of the cathode material:

a super-lattice peak is located at right of an (003) peak;

a ratio of an integral area of the (003) peak to an integral area of a (104) peak is smaller than 1.1; and a (018) peak and a (110) peak overlap with each other.

9. An electrode, comprising the cathode material according to claim 1.

10. A lithium-ion battery or a lithium metal battery, comprising a cathode and an anode, wherein the cathode is the electrode according to claim 9.

11. The cathode material according to claim 1, wherein a valence of the M' ions is +4.

12. The cathode material according to claim 1, wherein the M' ions comprise one or more of: $Mn^{4+}$, $Zr^{4+}$, $Ti^{4+}$, $V^{4+}$, $Sn^{4+}$, or $Ru^{4+}$.

* * * * *